United States Patent [19]  [11] 4,409,341
Hira et al.  [45] Oct. 11, 1983

[54] COMPOSITION FOR FIRE RETARDANT URETHANE FOAM

[75] Inventors: Yasuo Hira, Fujisawa; Susumu Tsuzuku, Tokyo; Makoto Iida, Kawasaki; Masao Gotoh, Yokosuka; Hitoshi Yokono, Katsuta; Yoshikazu Kimura, Seto; Kazumi Iijima, Katsuta, all of Japan

[73] Assignee: Hitachi, Ltd., Tokyo, Japan

[21] Appl. No.: 336,323

[22] Filed: Dec. 31, 1981

[30] Foreign Application Priority Data

Feb. 9, 1981 [JP] Japan .................................. 56-17002

[51] Int. Cl.³ ...................... C08G 18/14; C08G 18/32; C08G 18/77
[52] U.S. Cl. .................................... 521/162; 521/167; 521/107; 521/160; 521/901; 521/906
[58] Field of Search ............... 521/107, 167, 160, 162, 521/901, 906

[56] References Cited

U.S. PATENT DOCUMENTS 3,336,245 8/1967 Britain ................................. 521/167
3,424,701 1/1969 Kujawa .................................. 521/167
4,262,093 4/1981 Brown et al. ........................ 521/107

Primary Examiner—H. S. Cockeram
Attorney, Agent, or Firm—Antonelli, Terry & Wands

[57] ABSTRACT

A composition for polyurethane foam comprising (a) polyols containing at least one of alkylene oxide adducts of aniline-formaldehyde condensates and alkylene oxide adducts of reduced compounds of nitrated toluenes in an amount of 30 to 70% by weight of the polyols, (b) at least one isocyanate of the formula:

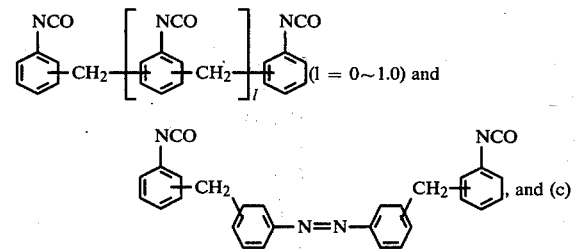

a fire retardant, together with one or more conventional catalysts, foam stabilizers, blowing agents and the like additives, can give fire retardant, high impact and heat resistant urethane foams.

8 Claims, No Drawings

COMPOSITION FOR FIRE RETARDANT URETHANE FOAM

BACKGROUND OF THE INVENTION

1. Field of the Invention

This invention relates to a composition for urethane foam excellent in fire retardancy, impact resistance and heat resistance.

2. Description of the Prior Art

Urethane foams have heretofore been produced by foaming in a open mold a composition comprising as the main constituents one or more isocyantes, polyols and blowing agents.

In recent years, a reaction injection molding technique (RIM technique) has been developed, and urethane foam with a high density skin layer and a low-density core layer (inside layer) is molded by a one-shot process.

However, the urethane foam produced by either of the above-mentioned methods is flammable.

In order to impart fire retardancy to urethane foam, there is known a method by which a halogen-containing organic compound and an antimony oxide are incorporated thereinto.

However, urethane foam given fire retardancy by this method has (a) a tendency to be greatly deteriorated in mechanical properties, particularly impact resistance, and (b) a tendency to be deteriorated in heat resistance. Particularly when urethane foam with a skin layer is produced by RIM method, the urethane foam has, besides the above (a) and (b), (c) a tendency to be deteriorated also in mechanical properties other than impact resistance because voids are apt to be formed in the skin layer and the cells become ununiform in the inside layer.

SUMMARY OF THE INVENTION

An object of this invention is to remove the above-mentioned defects of the conventional techniques and provide a composition which can give a urethane foam excellent in mechanical properties, heat resistance and fire retardancy.

The above-mentioned object can be accomplished by using one or more agents for imparting fire retardancy (fire retardant) which are good in compatibility with the isocyanates and the polyols as the main components in a composition for urethane foam, and do not greatly deteriorate physical properties (mechanical characteristics and heat resistance) of the foamed article, and by using as a part of the polyols and the isocyanates, those which improve the physical properties of the foamed article.

This invention provides a composition comprising the following (a) to (c) as the indispensable constituents:

(a) at least one compound constituting 30 to 70% by weight of the total polyols which compound is selected from those represented by the following general formulae (1) and (2):

(1)

(2)

wherein m is zero or an integer of 1 to 4; $Z_1$ through $Z_{10}$ are individually $$\text{+CH}_2\text{—CH(CH}_3\text{)—O}\text{)}_{n_1}\text{—H, +CH}_2\text{—CH}_2\text{—O}\text{)}_{n_2}\text{—H, or}$$

$$\text{+CH}_2\text{—CH(CH}_3\text{)—O}\text{)}_{n_3}\text{+CH}_2\text{—CH}_2\text{—O}\text{)}_{n_4}\text{—H}$$

in which $n_1$ through $n_4$ are individually an integer of 1 to 4, (b) as an isocyanate, at least one compound selected from compounds represented by the following general formulae (3) and (4):

(3)

wherein l is 0–1.0, (4)

which compound is incorporated in an amount in the range from 0.9 to 1.3 in terms of isocyanate index to the total compounds (a), and (c) as a fire retardant, at least one phosphorus compound which is liquid at room temperature (25° C.) under atmospheric pressure, and incorporated in a proportion of 0.35 to 3.0% by weight in terms of phosphorus element based on the total amounts of the above-mentioned compounds (a), (b) and the phosphorous compound.

DESCRIPTION OF THE PREFERRED EMBODIMENTS

Urethane foams produced from the composition of this invention come up to 94V-0 and 94V-1, the criteria set forth in U.L. (Underwriters' Laboratories Inc.) No. 94 tests, in vertical flammability tests.

Next, the starting materials used in this invention are explained below.

(a) POLYOLS

The polyols of the above-mentioned general formula (1) are compounds obtained by adding an alkylene oxide such as propylene oxide or ethylene oxide to a compound prepared by reacting aniline with formaldehyde. Concrete examples thereof include N,N,N',N'-tetrakis(2-hydroxypropyl)-4,4'-diaminodiphenylmethane, N,N,N',N'-tetrakis(hydroxyethyl)-4,4'-diaminodiphenylmethane, N,N'-di(2-hydroxyethyl)-N,N'-di(hydroxyethyl)-4,4'-diaminodiphenylmethane, N,N,N'-tris(2-hydroxypropyl)-N'-hydroxyethyl-4,4'-diaminodiphenylmethane, N,N,N',N'-tetrakis(isopropyleneoxy-2-hydroxypropyl)-4,4'-diaminodiphenylmethane, and the like. These are used alone or in admixture of two or more of them.

The polyols of the above-mentioned general formula (2) include all compounds obtained by adding an alkylene oxide such as propylene oxide or ethylene oxide to a compound prepared by nitrating toluene and then reducing it. Concrete examples thereof include N,N,N',N'-tetrakis(2-hydroxypropyl)tolylenediamine, N,N,N',N'-tetrakis(hydroxyethyl)tolylenediamine, and the like. These are used alone or in admixture of two or more of them.

The polyols of the above-mentioned general formulae (1) and (2) constitute 30 to 70% by weight of the total polyols, and this is because when they constitute less than 30% by weight, the desired fire retardancy and heat resistance cannot be obtained, and when they constitute more than 70% by weight, the viscosity increases, resulting in difficulty in handling. The reason why the added number of the alkylene oxide is 4 or less is the same as mentioned above.

Polyols which can be used together with the polyols of the above-mentioned general formulae (1) and (2) include all generally known polyols. Concrete examples thereof include alkylene oxide adducts of propylene glycol, glycerol, trimethylolpropane, triethanolamine, ethylenediamine, and the like. As examples thereof other than them, there are polyether polyols and polyester polyols described in J. H. Saunders and K. C. Frish "Polyurethanes Chemistry and Technology Part I Chemistry, Part II Technology" Robert E. Krieger Publishing Company, Huntington, New York, 1978; David Staley "Analytical Chemistry of the Polyurethanes, Polyurethanes: Part III" Robert E. Kreiger Publishing Company, Huntington, New York, 1979; and Keiji Iwata "Lectures on Plastic Materials (2), Polyurethane Resin" Nikkan Kogyo Press, 1975. These are used alone or in admixture of two or more of them.

(b) ISOCYANATES

The isocyanates are MDI (methylenediphenyl diisocyanate) series compounds obtained by reacting phosgene with a reaction product of aniline and formaldehyde, and include not only MDI itself but also analogous isocyanates, namely, polyphenylenepolymethylene polyisocyanates, carbodiimide modified MDI, and the like.

That is to say, among the isocyanates used in this invention, the compounds represented by the above-mentioned formula (3) include, for example, 4,4'-diphenylmethane diisocyanate, dimethylenetriphenyl triisocyanate, and the like. The compounds represented by the above-mentioned formula (4) include, for example, carbodiimide modified 4,4'-diphenylmethane diisocyanates, and the like. These are used alone or in admixture of two or more of them.

It is necessary that the incorporated amount of the isocyanate should be 0.9 to 1.3 in terms of isocyanate index to the total polyols. (Here, the term "isocyanate index" means a molar ratio of NCO group in the isocyanate compound to OH group in the polyol compound and water). This is because when the isocyanate index is less than 0.9, the heat resistance is lowered, and when it is more than 1.3, the impact resistance is lowered.

(c) FIRE RETARDANT

The fire retardants include tricresyl phosphate, cresylphenyl phosphate, triphenyl phosphate, tributyl phosphate and the like, and particularly include halogen-containing phosphoric esters, for example, tris($\beta$-chloroethyl)phosphate, tris(dichloropropyl)phosphate, tris(2,3-dibromopropyl)phosphate, tris(bromochloropropyl)phosphate, tetrakis(2-chloroethyl)ethylene diphosphate, and the like. These are used alone or as a mixture thereof. It is an essential condition that the incorporated amount thereof is 0.35% by weight or more in terms of the constant of phosphorus element in the whole composition. It is a condition necessary for imparting fire retardancy up to the criteria set forth in U.L. The upper limit of the content of phosphorus element is not critical, however it should be 3% by weight or less from a consideration of other characteristics such as bending strength, heat resistance and the like of the resulting foam.

The reason why the above-mentioned phosphorus compounds do not lower the heat resistance and the impact resistance as compared with antimony oxides and the like is presumed to be that they enter into some chemical combination with the polyols and the isocyanates.

The composition of this invention may further contain conventional additives such as catalysts, blowing agents, foam stabilizers, fillers, pigments, dyes, and the like.

The catalysts include tertiary amines (e.g., triethylenediamine and dimethyl ethanolamine), morpholine compounds, imidazole compounds, esters of tin (e.g., dibutyl tin dilaurate and dibutyl tin diacetate), etc. These may be used alone or in admixture of two or more of them. The incorporated amount thereof is difficult to unequivocally determine because the activity is very different depending upon the catalyst used, though as the measure of a proper incorporated amount, the time from mixing of the composition till the beginning of foaming (generally called "cream time") is desired to be 1 to 30 seconds. By the way, in the case of triethylenediamine which is a catalyst for universal use, its incorporated amount is preferably about 0.2 to 5 parts by weight per 100 parts by weight of the above-mentioned polyols.

As the foam stabilizers, there may be used all copolymers of an oxyalkylene and polydimethylsiloxane and fluorine series surfactants. These are used alone or in admixture of two or more of them. The incorporated amount thereof is preferably 0.1 to 5 parts by weight per 100 parts by weight of the above-mentioned polyols. When it is too small, e.g., less than 0.1 part by weight, the cells of foam become coarse or voids tend to be formed, and when it is too large, e.g., more than 5 parts by weight, the foaming effect reaches the upper limit, so that the material cost is increased.

As the blowing agents, there may be used water, halogenated hydrocarbons such as trichlorofluoromethane, and the like. These are used alone or in admixture thereof. The incorporated amount thereof is preferably 0.1 to 1 part by weight per 100 parts by weight of the above-mentioned polyols.

In addition to the materials described above, there may sometimes be used together with them glass fiber as a filler, iron oxide red as a pigment, and a diazo compound as a dye.

As the catalysts, blowing agents, fillers, pigments, dyes and the like, there may be used, beside those described above, the compounds described in the aforesaid references.

Urethane foams can be produced by mixing a solution A containing the aforesaid compounds (a) and (c) and if necessary, the above-mentioned components with a solution B containing the aforesaid compound (b) and if necessary, the above-mentioned components, and then injecting the resulting mixture into a closed metallic mold or an open mold (the conventional method), or by subjecting the solutions A and B to impingement mixing at 8 to 20 MPa in a reaction injection molding machine, and then injecting the resulting mixture into a metallic mold (RIH).

As the reaction injection molding machine, there may be used those which have already been put on the market by Tohō Machinery Co., Ltd. (Japan), Cincinnati Milacron Inc. (USA), Battenfeld Machinenfabriken GMBH (West Germany), Elastogran Maschinenbau (West Germany), Maschinenfabrik Hennecke GmbH (West Germany), Kraus-Maffei A. G. (West Germany), etc.

As the mold, there may be used metallic molds made of aluminum, iron or the like, resin molds made of silicone rubber, epoxy resin or the like, and wooden molds. Foam having no skin layer can be also produced by foaming the composition in an open mold.

This invention is illustrated by way of the following Examples, in which all parts and percents are by weight unless otherwise specified.

EXAMPLE 1

When a foam with a skin layer was formed by used of the apparatus and conditions shown in Table 1 by employing a composition for polyurethane foam of the composition No. 1 in Table 2, there could be obtained a foamed article which was excellent in characteristics as shown in Table 3. That is to say, tricresyl phosphate was added as a fire retardant to a mixed solution comprising 40 parts of a propylene oxide adduct of 4,4'-diaminodiphenylmethane (comprising N,N,N',N'-tetrakis-(2-hydroxypropyl)-4,4'-diaminodiphenylmethane as the main constituent), 45 parts of a propylene oxide adduct of monoethanolamine, 15 parts of a propylene oxide-ethylene oxide adduct (addition molar ratio of propylene oxide to ethylene oxide is 2:1) of glycerol, 1.0 part of a polydimethylsiloxane-oxyalkylene copolymer, 1.0 part of triethylenediamine, and 1.0 part of water, and the resulting mixture was sufficiently mixed to prepare a solution A. Subsequently, 6.33 g of said solution A and 8.67 g of a solution B comprising crude MDI (methylenediphenyl diisocyanate) were subjected to impingement mixing in a compound ratio (by weight) B/A of 1.37 under the conditions shown in Table 1, injected into a predetermined mold, and then hardened. The phosphorus element content of the compsoition was 0.58%. The resulting foamed article had a skin layer, and its density (the average density of the foamed article) was 0.6 g/cm$^3$. The foamed article was subjected to U.L. 94 flammability tests to find that it has a maximum combustion time of 22 seconds, a total combustion time of ten times of 105 seconds, and fire retardancy up to 94V-1. Its bending strength, Izod impact value and glass transition temperature were as high as 420 Kg/cm$^2$, 14 Kg.cm/cm$^2$ and 130° C., respectively. The surface of the foam was in a good condition without voids. The foamed article was cut and the condition of the inside was observed to find that it was in a good condition, that is, the cells were fine, though they were slightly insufficient in uniformity.

EXAMPLES 2 TO 14

A foamed article of rigid polyurethane foam with a skin layer was produced by use of the apparatus and molding conditions shown in Table 1 by employing the compositions Nos. 2 to 14 in Table 2 which were based on this invention. As the fire retardant, a halogen-containing phosphoric ester was used in all the cases. The resulting foamed articles were evaluated by the evaluation method shown in Table 1 to find that they had characteristics shown in the columns for Nos. 2 to 14 in Table 3. They were excellent in all characteristics such as fire retardancy, bending strength, Izod impact strength and glass transition temperature. Further, the condition of surface of the foams were very good, and that of the inside of the foams were so good that the cells were uniform and fine.

TABLE 1

| | Items | Details |
|---|---|---|
| Apparatus | Mold | Made of steel |
| | | Inside dimensions of cavity: 50cm × 50cm × 1cm |
| | Molding machine | Reaction injection molding machine manufactured by Battenfeld Maschinenfabriken GMBH (West Germany) |
| Molding Conditions | Temperature of mold | 50° C. |
| | Temperature Solution A of solutions | 35° C. |
| | Solution B | 25° C. |
| | Impingement mixing pressure | 150 kg/cm$^2$ |
| | Injection speed | 280 g/S |
| | Fire retardancy test | U.L. No. 94 vertical flammability test |
| | Bending strength | According to ASTM D790 |
| | Izod impact value | According to ASTM D256 (no notch) |
| Evaluation method | Glass transition temperature | Temperature at which the dynamic modulus begins to decrease rapidly. (The dynamic modulus is measured by means of a viscoelasticity spectrometer manufactured by Iwamoto Factory Co. Ltd.) |
| | Condition of the surface of foam | Observed with the naked eye |
| | Condition of the inside of foam | Observed with a microscope |

TABLE 2

| Solution | Materials and others | | Composition No. 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| Solution A | Aromatic amine series polyol | Propylene oxide adduct of 4,4'-diaminodiphenylmethane (OH value: 440 KOH mg/g)* | 40 | 30 | 40 | 65 | 40 | 40 | — | — | 40 | 40 | 40 | 40 | 40 | 40 | — |
| | | Propylene oxide adduct of 4,4'-diaminodiphenylmethane (OH value: 340 KOH mg/g)* | — | — | — | — | — | — | 40 | — | — | — | — | — | — | — | 30 |
| | | Propylene oxide adduct of tolylenediamine (OH value: 510 KOH mg/g)** | — | — | — | — | — | — | — | 50 | — | — | — | — | — | — | 30 |
| | Ordinary polyol | Propylene oxide adduct of monoethanolamine (OH value: 860 KOH mg/g) | 45 | 45 | 45 | 45 | 45 | 45 | 45 | — | 45 | 45 | 45 | 45 | 45 | 60 | — |
| | | Propylene oxide adduct of triethanolamine (OH value: 670 KOH mg/g) | — | — | — | — | — | — | — | 30 | — | — | — | — | — | — | — |
| | | Propylene oxide adduct of glycerol (OH value: 720 KOH mg/g) | — | — | — | — | — | — | — | — | — | — | — | — | — | — | 40 |
| | | Propylene oxide-ethylene oxide adduct of glycerol (OH value: 60 KOH mg/g) | 15 | 25 | 15 | 20 | 15 | 15 | 15 | 20 | 15 | 15 | 15 | 15 | 15 | — | — |
| | Blowing agent and others | Polydimethylsiloxane-oxyalkylene copolymer | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| | | Triethylenediamine | 1.0 | 1.0 | 1.0 | 1.0 | 1.0 | 1.0 | 1.0 | 1.0 | 1.0 | 1.0 | 1.0 | 1.0 | 1.0 | 1.5 | 2.0 |
| | | Trichlorofluoromethane | — | — | — | — | — | — | — | — | 2.5 | 8 | — | — | — | — | — |
| | | Water (distilled water) | 1.0 | 1.0 | 1.0 | 1.0 | 1.0 | 1.0 | 1.0 | 1.0 | — | 0.5 | 0.5 | 1.0 | 1.0 | 1.0 | 0.25 |
| | | Tetrakis(2-chloroethyl)ethylene diphosphate (phosphorus content: 11.5%) | — | 20 | 20 | 20 | 9 | 40 | 20 | 20 | 35 | 20 | 20 | — | — | 90 | 45 |
| | | Tris(chloroethyl) phosphate (phosphorus content: 10.9%) | — | — | — | — | — | — | — | — | — | — | — | 20 | — | — | — |
| | | Tris(dichloropropyl) phosphate (phosphorus content: 7.2%) | — | — | — | — | — | — | — | — | — | — | — | — | 20 | — | — |
| | | Tricresyl phosphate (phosphorus content: 8.4%) | 20 | — | — | — | — | — | — | — | — | — | — | — | — | — | — |
| Solution B | Isocyanate | Crude MD1*** (NCO content: 31%) | 169 | 159 | 169 | 157 | 169 | 169 | 158 | 141 | 153 | 161 | 161 | 169 | 169 | 193 | 149 |

Note
*N,N,N',N'—tetrakis(2-hydroxypropyl)-4,4'-diaminodiphenylmethane is the main constituent.
**N,N,N',N'—tetrakis(2-hydroxypropyl)-tolylenediamine is the main constituent.
***4,4'-Diphenylmethane diisocyanate is the main constituent.

EXAMPLE 15

A rigid polyurethane foamed article was produced by use of the composition No. 15 in Table 2 by employing the apparatus and molding conditions shown in Table 1, except that there was used a wooden open mold having the inside dimensions: length=50 cm, width=50 cm, and height=20 cm. The characteristics of the resulting foamed article were evaluated by the evaluation method shown in Table 1 to find that they were as shown in the foam's characteristics section for No. 15 in Table 3. That is to say, the fire retardancy came up to U.S.94V-1, and the bending strength, Izod impact value and glass transition temperature all were high. The condition of the inside of the foam was so good that the cells were uniform and fine.

COMPARATIVE EXAMPLE 1

A foamed article with a skin layer was produced in the same way as in Example 3 by using the composition No. 16 in Table 4, namely, the same composition as the composition No. 3, except that a propylene oxide adduct of sorbitol was substituted as a polyol for the propylene oxide adduct of 4,4'-diaminodiphenylmethane, and its characteristics were evaluated. As a result, it showed the characteristics shown in the column for the composition No. 16 in Table 5. That is to say, the bending strength and the Izod impact value are almost equal to those in Example 3, however the fire retardancy did not come up to U.L.94V-1, and the glass transition temperature was low and both the conditions of the surface and inside of the foam were inferior to those of the foamed article in Example 3.

namely, a composition in which the incorporated amount of the fire retradant was smaller than that in Example 3, and its characteristics were evaluated. As a result, it showed the characteristics shown in the col-

TABLE 3

| Items | | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| Phosphorus element content (wt %) | | | 0.58 | 0.82 | 0.79 | 0.82 | 0.37 | 1.47 | 0.82 | 0.87 | 1.28 | 0.79 | 0.81 | 0.75 | 0.49 | 2.60 | 1.74 |
| Compounding ratio (solution B/ solution A) (wt ratio) | | | 1.37 | 1.29 | 1.37 | 1.28 | 1.51 | 1.18 | 1.28 | 1.14 | 0.94 | 1.24 | 1.32 | 1.37 | 1.37 | 1.00 | 1.01 |
| Injected amounts of solutions A and B | Solution A | | 633 | 655 | 633 | 658 | 598 | 688 | 658 | 701 | 322 | 556 | 862 | 633 | 633 | 710 | 435 |
| | Solution B | | 867 | 845 | 867 | 842 | 902 | 812 | 642 | 799 | 303 | 569 | 1138 | 867 | 867 | 790 | 440 |
| Character- istics of foam | Density (g/cm³) | | 0.6 | 0.6 | 0.6 | 0.6 | 0.6 | 0.6 | 0.6 | 0.6 | 0.25 | 0.45 | 0.8 | 0.6 | 0.6 | 0.6 | 0.35 |
| | Flammabil- ity test re- sults (UL- 94) | Maximum combustion time (S) | 22 | 12 | 8 | 6 | 28 | 4 | 8 | 11 | 12 | 14 | 6 | 12 | 15 | 3 | 13 |
| | | Total com- bustion time of 10 times (S) | 105 | 90 | 55 | 35 | 150 | 28 | 60 | 70 | 65 | 70 | 28 | 45 | 55 | 18 | 60 |
| | | Judgement | Up to V-1 | Up to V-1 | Up to V-0 | Up to V-0 | Up to V-2 | Up to V-0 | Up to V-0 | Up to V-1 | Up to V-1 | Up to V-1 | Up to V-0 | Up to V-1 | Up to V-1 | Up to V-0 | Up to V-1 |
| | Bending strength (Kg/ cm²) 25° C. | | 420 | 390 | 450 | 480 | 490 | 370 | 390 | 385 | 250 | 320 | 530 | 400 | 405 | 390 | 185 |
| | Izod impact value (Kg · cm/cm²) 25° C. | | 14 | 14 | 14 | 13 | 14 | 15 | 16 | 12 | 11 | 12 | 16 | 13 | 14 | 13 | 7 |
| | Glass transition temperature (°C.) | | 130 | 115 | 130 | 135 | 138 | 105 | 115 | 110 | 125 | 128 | 130 | 135 | 130 | 112 | 128 |
| | Condition of the surface of foam with a skin layer* | | ◎ | ◎ | ◎ | ◎ | ◎ | ◎ | ◎ | ◎ | ◎ | ◎ | ◎ | ◎ | ◎ | ◎ | — |
| | Condition of the inside of the foam** | | B | A | A | A | A | A | A | A | A | A | A | A | A | A | A |

*◎ : The condition of the surface is very good.
○ : The condition of the surface is good.
**A: The condition of the inside is so good that the cells are uniform and fine.
B: The condition of the inside is good, that is, the cells are fine, though they are a little insufficient in uniformity.

COMPARATIVE EXAMPLE 2

A foamed article with a skin layer was produced in the same way as in Example 3 by using the composition No. 17 in Table 4, namely, a composition in which polyols including a smaller amount of an aromatic amine series polymer were used, and its characteristics were evaluated. As a result, it showed the characteristics shown in the column for the composition 17 in Table 5. That is to say, it was inferior to the foamed article in Example 3 in fire retardancy, heat resistance, the condition of the surface of the foam, and the condition of the inside of the foam.

COMPARATIVE EXAMPLE 3

A foamed article was produced in the same way as in Example 3 by using the composition No. 18 in Table 4, umn for No. 18 in Table 5. That is to say, it was inferior in fire retardancy to the foamed article in Example 3.

COMPARATIVE EXAMPLES 4, 5 AND 6

Foamed articles were produced in the same way as in Example 3 by using each of the compositions No. 19, 20 and 21 in Table 4, namely, the same compositions as in Example 3, except that the fire retardant was changed from that in Example 3 to ammonium polyphosphate, red phosphorus and hexabromobenzene, respectively, and their characteristics were evaluated. As a result, they showed the characteristics shown in the columns for Nos. 19, 20 and 21, respectively, in Table 5. That is to say, they had lower Izod impact values than did the foamed article in Example 3, and were inferior to the latter in the condition of the surface of the foams and that of the inside of the foams.

TABLE 4

| Solution | | Materials and others | Composition No. | | | | | | |
|---|---|---|---|---|---|---|---|---|---|
| | | | 16 | 17 | 18 | 19 | 20 | 21 | 22 |
| Solution A | Aromatic amine series polyol | Propylene oxide adduct of 4,4'-diaminodiphenylmethane (OH value: 440 KOH mg/g)* | — | 20 | 40 | 40 | 40 | 40 | 40 |
| | Ordinary polyol | Propylene oxide adduct of sorbitol (OH value: 440 KOH mg/g) | 40 | 10 | — | — | — | — | — |
| | | Propylene oxide of mono- ethanolamine (OH value: 860 KOH mg/g) | 45 | 45 | 45 | 45 | 45 | 45 | 45 |
| | | Propylene oxide-ethylene oxide adduct of glycerol (OH value: 60 KOH mg/g) | 15 | 15 | 15 | 15 | 15 | 15 | 15 |
| | Blowing agent and others | Polydimethylsiloxane- oxyalkylene copolymer | 1.0 | 1.0 | 1.0 | 1.0 | 1.0 | 1.0 | 1.0 |
| | | Triethylenediamine | 1.0 | 1.0 | 1.0 | 1.0 | 1.0 | 1.0 | 1.0 |

TABLE 4-continued

| Solution | Materials and others | | Composition No. | | | | | | |
|---|---|---|---|---|---|---|---|---|---|
| | | | 16 | 17 | 18 | 19 | 20 | 21 | 22 |
| | Fire retardant | Water (distilled water) | 1.0 | 1.0 | 1.0 | 1.0 | 1.0 | 1.0 | 1.0 |
| | | Tetrakis(2-chloroethyl)-ethylene diphosphate (phosphrus content: 11.5%) | 20 | 20 | 5 | — | — | — | 20 |
| | | Ammonium polyphosphate (phosphrus content 31.5%) | — | — | — | 10 | — | — | — |
| | | Red phosphrus (phosphrus content 100%) | — | — | — | — | 5 | — | — |
| | | Hexabromobenzene | — | — | — | — | — | 20 | — |
| Solution B | Isocyanate | Crude MDI** (NCO content: 31%) | 169 | 169 | 169 | 169 | 169 | 169 | — |
| | | Crude TDI*** (NCO content: 48%) | — | — | — | — | — | — | 109 |

*N,N,N',N'—tetrakis(2-hydroxypropyl)-4,4'-diaminodiphenylmethane is the main constituent.
**4,4'-Diphenylmethane diisocyanate is the main constituent.
***Tolylene diisocyanate is the main constituent.

TABLE 5

| | Items | | Composition No. | | | | | | |
|---|---|---|---|---|---|---|---|---|---|
| | | | 16 | 17 | 18 | 19 | 20 | 21 | 22 |
| Phosphorus element content (wt %) | | | 0.79 | 0.82 | 0.21 | 1.12 | 1.81 | 0 | 0.99 |
| Compounding ratio (solution B/solution A) (wt ratio) | | | 1.37 | 1.37 | 1.56 | 1.50 | 1.56 | 1.37 | 0.89 |
| Injected amounts of solutions A and B | Solution A | | 633 | 633 | 586 | 600 | 586 | 634 | 794 |
| | Solution B | | 867 | 867 | 914 | 900 | 914 | 866 | 706 |
| Characteristics of foam | Density (g/cm$^3$) | | 0.6 | 0.6 | 0.6 | 0.6 | 0.6 | 0.6 | 0.6 |
| | Flammability test results (UL-94) | Maximum combustion time (S) | 38 | 20 | 58 | 7 | 5 | 60 | 12 |
| | | Total combustion time of 10 times | 165 | 102 | 256 | 40 | 25 | 305 | 85 |
| | | Judgement | Not up to V-1 | Up to V-1 Not up to V-0 | Not up to V-1 | Up to V-0 | Up to V-0 | Not up to V-1 | Not up to V-0 Up to V-1 |
| | Bending strength (kg/cm$^2$) 25° C. | | 410 | 380 | 450 | 420 | 430 | 430 | 370 |
| | Izod impact value (kg · cm/cm$^2$) 25° C. | | 10 | 12 | 14 | 6 | 6 | 7 | 10 |
| | Glass transition temperature (°C.) | | 120 | 115 | 132 | 130 | 130 | 130 | 98 |
| | Condition of the surface of foam with a skin layer* | | ◎ | ◎ | ◎ | ◎ | X | X | ◎ |
| | Condition of the inside of the foam** | | B | B | B | C | C | C | C |

Note
*◎: The condition of the surface is very good.
○: The condition of the surface is good.
X: Voids are present.
**A: The condition of the inside is so good that the cells are uniform and fine.
B: The condition of the inside is good, that is, the cells are fine, though they are a little insufficient in uniformity.
C: The cells are poor in uniformity and the inside is coarse.

COMPARATIVE EXAMPLE 7

A foamed article was produced in the same way as in Example 3 by using the composition No. 22 in Table 4, namely, the same composition as in Example 3, except that the isocyanate was changed from that in Example 3 to crude TDI, and its characteristics were evaluated. As a result, it showed the characteristics shown in the column for the composition No. 22 in Table 5. That is to say, it was inferior particularly in fire retardancy to the foamed article in Example 3 and had a lower glass transition temperature than did the latter.

As described in detail in Examples, fire retardant foam which is excellent in mechanical properties and heat resistance and have a uniform cell structure can be produced at a low cost by using the composition of this invention. Particularly, there can be obtained a foamed article of foam with a skin layer which is free from deterioration in impact resistance and in the condition of the surface of the foam that is the defect of conventional fire retardant composition.

Therefore, the composition of this invention can widely be used in housing materials for various electric and electronic machinery and tools, building materials, heat insulating materials, sound-absorbing materials, and the like which are required to have fire retandancy.

What is claimed is:

1. In a composition for forming rigid polyurethane foam comprising one or more polyols, one or more isocyanates, one or more catalysts, one or more foam stabilizers, one or more blowing agents and one or more fire retardants, the improvement wherein
   (a) the one or more polyols comprises at least one polyol selected from polyols represented by the formulae (1) and (2) in an amount of 30 to 70% by weight of the polyols contained within said composition:

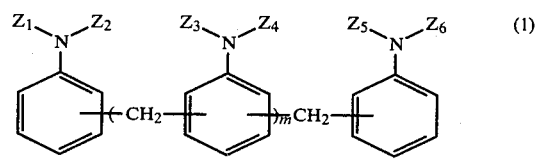

-continued

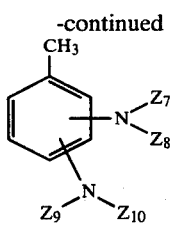
(2)

wherein m is zero or an integer of 1 to 4; $Z_1$ through $Z_{10}$ are individually $$+CH_2-\overset{\overset{\displaystyle CH_3}{|}}{CH}-O\overset{}{\underset{n_1}{)}}H, +CH_2-CH_2-O\overset{}{\underset{n_2}{)}}H, \text{ or}$$

$$+CH_2-\overset{\overset{\displaystyle CH_3}{|}}{CH}-O\overset{}{\underset{n_3}{)}}+CH_2-CH_2-O\overset{}{\underset{n_4}{)}}H,$$

in which $n_1$ through $n_4$ are each an integer of 1 to 4;

(b) the one or more isocyanates consist of at least one isocyanate selected from isocyanates represented by the following formulae (3) and (4):

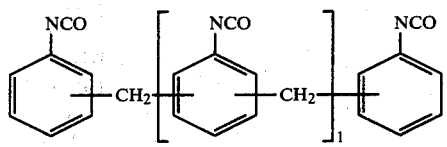
(3)

wherein 1 is 0–1.0,

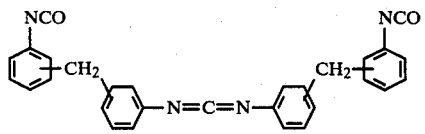
(4)

the amount of the one or more isocyanates being 0.9 to 1.3 in terms of isocyanate index to the total polyols (a); and (c) the one or more fire retardant consist of at least one halogen-containing phosphoric ester which is liquid at room temperature under atmospheric pressure; the amount of the one or more fire retardants being at least 0.35% by weight in terms of the content of phosphorus element in the total composition.

2. A composition according to claim 1, wherein the amount of said at least one halogen-containing phosphoric ester (c) is 0.35 to 3.0% by weight in terms of phosphorus element based on the sum of the weights of said (a), (b) and (c).

3. A composition according to claim 1, wherein the polyol represented by the formula (1) obtained by adding alkylene oxide to an aniline-formaldehyde condensate and/or the polyol represented by the formula (2) obtained by adding alkylene oxide to a reduced compound of nitrated toluene are used in an amount of 30 to 70% by weight based on the total weight of the polyols.

4. A composition according to claim 3, wherein the alkylene oxide is ethylene oxide or propylene oxide.

5. A composition according to claim 3, wherein the polyol represented by the formula (1) is at least one of N,N,N',N'-tetrakis(2-hydroxypropyl)-4,4'-diaminodiphenylmethane, N,N,N',N'-tetrakis(hydroxyethyl)-4,4'-diaminophenylmethane, N,N'-di(2-hydroxyethyl)-N,N'-di(hydroxyethyl)-4,4'-diaminodiphenylmethane, N,N,N'-tris(2-hydroxypropyl)-N'-hydroxyethyl-4,4'-diaminodiphenylmethane, and N,N,N',N'-tetrakis(isopropyleneoxy-2-hydroxypropyl)-4,4'-diaminophenylmethane.

6. A composition according to claim 3, wherein the polyol represented by the formula (2) is at least one of N,N,N',N'-tetrakis(2-hydroxypropyl)tolylenediamine and N,N,N',N'-tetrakis(hydroxyethyl)tolylenediamine.

7. A composition according to claim 1, wherein the isocyanate represented by the formula (3) is at least one of 4,4'-diphenylmethane diisocyanate and dimethylenetriphenyl triisocyanate and the isocyanate represent by the formula (4) is at least one of carbodiimide modified 4,4'-diphenylmethane diisocyanates.

8. A composition according to claim 1, wherein the phosphoric ester is at least one of tris($\beta$-chloroethyl) phosphate, tris(dichloropropyl) phosphate, tris(2,3-dibromopropyl) phosphate, tris(bromochloropropyl) phosphate and tetrakis(2-chloroethyl)ethylene diphosphate.

* * * * *